United States Patent [19]
Collette et al.

[11] Patent Number: 5,604,171
[45] Date of Patent: Feb. 18, 1997

[54] CATALYTIC SYSTEM WHICH MAY BE USED FOR THE POLYMERIZATION OF ALPHA-OLEFINS AND PROCESS FOR THIS POLYMERIZATION

[75] Inventors: Hervé Collette, Namur; Sabine Pamart, Mons, both of Belgium

[73] Assignee: Solvay (Société Anonyme), Brussels, Belgium

[21] Appl. No.: 336,652

[22] Filed: Nov. 4, 1994

[30] Foreign Application Priority Data

Nov. 4, 1993 [BE] Belgium ............................... 09301213

[51] Int. Cl.$^6$ .......................... B01J 31/00; B01J 37/00; C08F 4/02; C08F 4/60
[52] U.S. Cl. ..................... 502/120; 502/103; 502/113; 502/116; 502/126
[58] Field of Search .................... 502/103, 120, 502/126, 116, 113

[56] References Cited

U.S. PATENT DOCUMENTS

| | | | |
|---|---|---|---|
| 3,489,735 | 1/1970 | Takahashi et al. | 260/88.2 |
| 3,989,641 | 11/1976 | Jaggard | 252/429 B |
| 4,210,729 | 7/1980 | Hermans et al. | 525/247 |
| 4,210,738 | 7/1980 | Hermans et al. | 528/152 |
| 4,295,991 | 10/1981 | Wristers | 526/119 |
| 4,309,521 | 1/1982 | Sato et al. | 502/113 |
| 4,472,524 | 9/1984 | Albizzati | 502/113 |
| 5,206,198 | 4/1993 | Costa et al. | 502/107 |
| 5,476,825 | 12/1995 | Fushimi et al. | 502/126 |
| 5,480,849 | 1/1996 | Gustafsson et al. | 502/103 |
| 5,498,770 | 3/1996 | Hosaka et al. | 502/116 |
| 5,506,183 | 4/1996 | Sano et al. | 502/113 |

FOREIGN PATENT DOCUMENTS

| | | |
|---|---|---|
| 0021753 | 1/1981 | European Pat. Off. . |
| 0261727 | 3/1988 | European Pat. Off. . |
| 2371464 | 6/1978 | France . |
| 1484494 | 9/1977 | United Kingdom . |

OTHER PUBLICATIONS

G. Natta et al., "The Different Crystalline Modifications of TiCl3, a Catalyst Component for the Polymerization of alpha–Olefins. I: alpha–, beta–, gamma–TiCl3. II: delta–TiCl3", J. Polymer Sci., vol. 51, pp. 399–410.

*Primary Examiner*—Glenn A. Caldarola
*Assistant Examiner*—J. Pasterczyk
*Attorney, Agent, or Firm*—Spencer & Frank

[57] ABSTRACT

Catalytic composition which may be used for the polymerization of alpha-olefins, comprising:

(a) a solid catalyst comprising on titanium trichloride ($TiCl_3$),
(b) a non-halogen-containing cocatalyst comprising at least one non-halogen-containing organoaluminium compound, characterized in that the non-halogen-containing cocatalyst additionally contains at least one aminoalane containing no active hydrogen.

Such a catalytic system may additionally contain a tertiary constituent chosen from oxygenated organosilicon compounds.

3 Claims, No Drawings

CATALYTIC SYSTEM WHICH MAY BE USED FOR THE POLYMERIZATION OF ALPHA-OLEFINS AND PROCESS FOR THIS POLYMERIZATION

FIELD OF THE INVENTION

The present invention relates to a caralytic system which may be used for the stereospecific polymerization of alpha-olefins, a process for its production and a process for the polymerization of alphaolefins in the presence of this catalytic system.

THECHNOLOGY REVIEW

It is known to polymerize alpha-olefins using a catalytic system comprising a solid catalyst based on titanium chloride and a cocatalyst chosen from organic compounds of the metals of groups Ia, IIa and IIIa of the Periodic Table (version published in the Handbook of Chemistry and Physics, 50th edition).

Among the abovementioned catalytic systems, those which contain a solid catalyst based on titanium trichloride complexed with an electron-donating compound, of crystalline form and, by way of cocatalyst, a dialkylaluminium halide, most particularly diethylaluminium chloride, show maximum activity and stereospecificity. Such catalytic systems may also contain electron-donating tertiary constituents conventionally known for enhancing the stereospecificity thereof.

The use of these halogen-containing cocatalysts leads, however, to polymers containing relatively large amounts of halogen-containing residues which, if they are not removed, impart a corrosive nature thereto and adversely affect the stability thereof.

The use of non-halogen-containing cocatalysts such as trialkylaluminiums enables this problem to be resolved, but most often leads to the production of resins containing a large proportion of amorphous polymer.

It has been attempted to overcome this drawback by adding to the said catalytic system an electrondonating compound, preferably an amino or organophosphorus compound [Patent GB-A-1,486,194]. This document more particularly recommends the addition of amines containing no nitrogen-hydrogen bonds, for example such as tetramethylethylenediamine, pyridine, quinoline and isoquinoline. In this case, no formation of a bond between the aluminium of the organoaluminium compound and the nitrogen of the amine is observed, and the enhancement in stereospecificity which results from the presence of the amine is insufficient and occurs to the detriment of the catalytic productivity.

There have now been found halogen-poor catalytic systems which do not have the drawbacks of the systems described previously.

SUMMARY OF THE INVENTION

In this regard, the present invention relates to a catalytic system which may be used for the polymerization of alpha-olefins, comprising:

(a) a solid catalyst based on titanium trichloride ($TiCl_3$), (b) a non-halogen-containing cocatalyst comprising at least one non-halogen-containing organoaluminium compound, in which the non-halogen-containing cocatalyst additionally contains at least one aminoalane containing no active hydrogen.

DETAILED DESCRIPTION OF THE INVENTION

The non-halogen-containing organoaluminium compounds present in the cocatalyst (b) according to the present invention are generally chosen from trialkyl-aluminiums, alkylalkoxyaluminiums, alkylaluminium hydrides and compounds of aluminoxane type present in cyclic or linear form.

The preferred compounds are trialkylalumminiums possessing identical or different alkyl radicals containing from 1 to 12 carbon atoms.

Particularly good results are obtained by using trialkylaluminiums in which the alkyl radicals contain from 1 to 3 carbon atoms, such as trimethylaluminium, triethylaluminium, tripropylaluminium and triisopropylaluminium.

The cocatalysts (b) according to the invention additionally contain at least one aminoalane containing no active hydrogen.

According to the present invention, the aminoalanes containing no active hydrogen are preferably chosen from the organoaluminium compounds containing at least one aluminium/nitrogen bond which release no ethane when they are placed in the presence of triethylaluminium at a temperature of between 80° and 120° C. approximately.

These aminoalanes are, in addition, most often chosen from the compounds represented by the general formula:

$$(AlR_2)_{3-x}NR'_x \qquad (I)$$

in which

R represents a hydrocarbon radical which may contain one or more hetero atoms;

R' represents a hydrogen atom or a hydrocarbon radical which may contain one or more hetero atoms;

x is any number such that $0 \leq x < 3$; it being possible for the radicals R' and R, independently of each other, to represent identical or different radicals.

The aminoalanes which may be used according to the present invention advantageously contain no halogen-containing hetero atoms.

In the formula (I), R is preferably chosen from linear or branched alkyl radicals, containing from 2 to 8 carbon atoms and from radicals containing from 1 to 30 carbon atoms and one or more hetero atoms such as, for example, amino radicals which may themselves contain one or more aminoalane groups.

R' is preferably chosen from alkyl radicals which are linear or branched, cycloalkyl, alkenyl, aryl, alkylaryl and arylalkyl radicals which may themselves bear substituents containing one or more hetero atoms such as amino or aminoalane groups. The preferred radicals R' are alkyl and cycloalkyl radicals, more particularly those which contain from 1 to 18 carbon atoms. The radicals R' of this type bearing one or more amino or aminoalane groups are equally suitable. Among the latter compounds, the compounds whose amine functions bear no nitrogen-hydrogen bonding are preferred.

In the formula (I), x is preferably a number at least equal to 1. Preferably, x is a number which does not exceed 2.

The aminoalane may advantageously be obtained by reaction between an organoaluminium compound, preferably such as those defined above, and an amino compound comprising at least one nitrogen-hydrogen bond.

The amino compound is generally chosen from primary and secondary monoamines or from multifunctional amines containing at least one nitrogen-hydrogen bond.

Among these compounds, there may be mentioned:

as examples of primary monoamines, linear or branched monoalkylamines, monocycloalkylamines, monoalkenylamines and monoarylamines such as methylamine, ethylamine, propylamines, butylamines, cyclohexylamine and aniline;

as examples of secondary monoamines, dialkylamines, dicycloalkylamines, arylalkylamines, cycloalkylamines, alkylalkenylamines and diarylamines such as dimethylamine, diethylamine, dipropyl- and dibutylamines and diphenylamine;

as examples of multifunctional amines containing at least one nitrogen-hydrogen bond, there may be mentioned primary alkyldiamines such as ethylenediamine, 1,3-diaminopropane, 1,2-diaminopropane, 1,4-diaminobutane and 1,12-diaminododecane, primary aryldiamines such as phenylenediamines and secondary diamines such as N,N'-dimethyl- and N,N'-diethylethylenediamines.

Among these amino compounds, the alkylamines and cycloalkylamines are suitable and among them the primary and secondary monoamines as well as the primary diamines. Compounds of this type containing from 1 to 12 carbon atoms give good results.

As examples of amino compounds very particularly preferred, there may be mentioned ethylenediamine, 1,3-diaminopropane, 1,2-diaminopropane, 1,4-diaminobutane, 1,12-diaminododecane, mono- and dimethylamines, mono- and diethylamines, mono- and dipropylamines and mono- and dibutylamines.

The non-halogen-containing cocatalysts according to the invention generally contain amounts of non-halogen-containing organoaluminium compound and of aminoalane such that their molar ratio is from 0.05 to 10. This molar ratio is preferably at least 0.1 and more particularly at least 0.5. Good results are obtained when this molar ratio does not exceed 7 and preferably does not exceed 4.

The mode of production and of use of the cocatalysts according to the present invention is not critical. The non-halogen-containing organoaluminium compound and the aminoalane may, for example, be introduced, independently of each other, into the polymerization autoclave. It is also possible to place the non-halogen-containing organoaluminium compound in contact with the aminoalane under conditions such that the molar ratios described above are satisfied before introducing them into the polymerization autoclave.

One particularly advantageous way of obtaining the cocatalysts according to the present invention consists in reacting an amino compound comprising at least one nitrogen-hydrogen bond as described above with an excess of non-halogen-containing organoaluminium compound under conditions such that the mixture obtained contains free non-halogen-containing organoaluminium compound and does not give rise to any release of alkane when it is subjected to a heat treatment at a temperature of between 80° and 120° C. approximately. The non-halogen-containing organoaluminium compound used for this purpose is preferably a trialkylaluminium as described above.

The non-halogen-containing organoaluminium compound and the amino compound are placed in contact under conditions suitable for obtaining the cocatalysts described above.

When a trialkylaluminium is used as non-halogen-containing organoaluminium compound, the molar ratio between the aluminium of the trialkylaluminium and the nitrogen of the amino compound is generally greater than 1. Such a ratio is most often at least 1.05, preferably at least 1.1 and more particularly at least 1.5. It is, in addition, most often less than or equal to 11. Good results are obtained when this ratio is not greater than 8 and preferably when it is not greater than 5. The precise operating conditions depend in particular on the respective nature of the reactants and in particular of that of the amino compound.

In this way, when the amino compound, for example such as the secondary monoamines, contain only one nitrogen-hydrogen bond, the simple placing of this compound in contact with the trialkylaluminium at room temperature, for a sufficient period for them to react together, suffices to obtain a cocatalyst according to the present invention. The reaction between these two compounds is most often accompanied by a release of gas, enabling the progress thereof to be assessed. In this particular case, the contact time between the trialkyl-aluminium and the amino compound is generally from 1 minute to 2 hours, preferably from 5 minutes to 1 hour. On the other hand, when the amino compound used contains more than one nitrogen-hydrogen bond, for example such as the primary monoamines or the primary or secondary diamines, it is most often necessary to submit the mixture, at some point, preferably after having placed the compounds in contact, to a heat treatment. This heat treatment is generally carried out at a temperature of from 50° C. to 160° C. approximately. The temperature at which the heat treatment is carried out is preferably at least 65° C. and more particularly at least 80° C. This temperature is, in addition, most often 150° C. at most. Good results are obtained when this temperature is not greater than 120°. This heat treatment is most often accompanied by a release of gas and it is generally carried out until this release of gas is complete. The duration of the heat treatment is variable. It generally depends on the temperature at which it is carried out and on the respective concentrations of the compounds used. It is most often from 5 minutes to 7 hours and preferably from 20 minutes to 5 hours and more particularly from 30 minutes to 2 hours.

The reaction between the non-halogen-containing organoaluminium compound and the amino compound is preferably performed in a liquid phase. It is possible, for example, to introduce the amino compound into the non-halogen-containing organoaluminium compound which is generally liquid at room temperature, or into a solution of the latter in an inert hydrocarbon diluent generally chosen from aliphatic hydrocarbons, cycloaliphatic and aromatic liquids such as, for example, liquid alkanes and isoalkanes, benzene and its derivatives. The diluents used more particularly for this purpose are chosen from hydrocarbons which dissolve both the amino compound and the trialkylaluminium. Compounds giving good results are liquid aromatic diluents which are optionally mixed with liquid aliphatic or cycloaliphatic hydrocarbons. Good results are obtained using toluene. A preferred and particularly simple way of preparing the cocatalysts according to the present invention consists in mixing the trialkylaluminium and the amino compound which have been diluted beforehand in an inert diluent as described above.

It goes without saying that the cocatalysts containing one or more non-halogen-containing organoaluminium compounds and one or more aminoalanes also fall within the scope of the present invention.

The non-halogen-containing cocatalysts thus defined also constitute a specific subject of the present invention.

The catalytic systems according to the present invention also contain a solid catalyst based on $TiCl_3$ (a). The solid catalysts which may preferably be used according to the present invention are solids based on $TiCl_3$ of crystalline form δ as defined, for example, in Journal of Polymer Science 51, pages 399–410 (1961), complexed with an electron-donating compound. By way of specific examples of electron-donating compounds, there may be mentioned ethers, esters and alcohols. Aliphatic ethers are generally preferred and more particularly those in which the radicals comprise from 2 to 8 carbon atoms. Such solids are preferably obtained by processes involving a reduction of a titanium compound by an organometallic, preferably an organoaluminium, reducing agent.

By way of preferred examples of solid catalysts (a), there may be mentioned the solid catalysts obtained by successive or combined treatments of the solid derived from the reduction of titanium tetrachloride or tetra-alkoxide with an organoaluminium reducing agent, with an electron-donating compound as defined above and with a halogen-containing compound as described, for example, in U.S. Pat. No. 4,210,738 (SOLVAY) and U.S. Pat. No. 4,295,991, the content of which is incorporated by reference in the present description.

There may also be mentioned the solids obtained by heat treatment, in the presence of a halogen-containing compound, of the liquid material resulting from placing $TiCl_4$, pretreated with an electron-donating compound as defined above, in contact with a composition corresponding to the general formula:

$$AlR^1_p Z_q X_{3-(p+q)}$$

in which

R$^1$ represents a hydrocarbon radical containing from 1 to 18 carbon atoms and preferably from 1 to 12 carbon atoms, chosen from alkyl, aryl, arylalkyl, alkylaryl and cycloalkyl radicals;

Z represents a group chosen from —OR$^2$, —SR$^2$ and NR$^2$R$^3$ in which R$^2$ and R$^3$ represent, independently of each other, a hydrocarbon radical or a hydrogen atom;

X represents a halogen atom;

p is any number such that 0<p<3;

q is any number such that 0<q<3;

the sum (p+q) being such that 0<(p+q)≦3; as described in U.S. Pat. No. 5,206,198, the content of which is incorporated by reference into the present description.

The solids as described above, which have additionally undergone prepolymerization and/or activation treatments, are also suitable.

Prepolymerization treatment is generally understood to refer to treatments consisting in placing the solid catalyst, at any stage in its preparation, in contact with an alpha-olefin, such as, for example, propylene or ethylene, under polymerizing conditions so as to obtain a solid containing in general from approximately 5 to approximately 500% by weight of "prepolymerized" alpha-olefin relative to the weight of titanium trichloride. Such treatments are, for example, described in U.S. Pat. No. 4,210,729 (SOLVAY) and U.S. Pat. No. 4,295,991 and in Patent Application EP-A-261,727 (SOLVAY).

Activation treatment for the solid catalysts is generally understood to refer to treatments consisting in placing the solid catalyst, preferably separated from the medium in which it was prepared and optionally washed with an inert hydrocarbon diluent as described above, in contact with an activating agent chosen from organoaluminium compounds and the products of reaction of an organoaluminium compound with a compound chosen from hydroxyaromatic compounds in which the hydroxyl group is sterically hindered.

Details in relation to these activation treatments may be obtained in U.S. Pat. No. 4,210,729 (SOLVAY) and in Patent Application EP-A-261,727 (SOLVAY) the content of which is incorporated by reference into the present description.

Solid catalysts (a) which are equally suitable are the solid catalysts based on $TiCl_3$ complexed with an electron-donating compound deposited in, or on, organic or inorganic supports. These supports may, for example, be chosen from preformed polymers such as styrene polymers and copolymers, vinyl chloride polymers and copolymers, acrylic acid ester polymers and copolymers and olefin polymers or copolymers. They may also be chosen from inorganic supports such as silicon oxide, aluminium oxide, magnesium oxide, titanium oxide, zirconium oxide and their mixtures.

The preferred solid catalysts (a) are those obtained in the processes comprising successive or combined treatments of the solid derived from the reduction of titanium tetrachloride by an organoaluminium reducing agent, by an electron-donating compound and by a halogen-containing compound. The compounds prepared from solid catalysts based on $TiCl_3$ deposited in, or on, the supports described above are equally suitable.

Solid catalysts (a) which also enable particularly good results to be obtained are those which have undergone the activation treatment by being placed in contact with an organoaluminium compound or with the product of the reaction between an organoaluminium compound and a hydroxyaromatic compound in which the hydroxyl group is sterically hindered.

The organoaluminium compound which may be used for producing these specific solid catalysts is preferably chosen from trialkylaluminiums and alkylaluminium chlorides. Among these compounds, the best results have been obtained with triethylaluminium and diethylaluminium chloride.

The hydroxyaromatic compound in which the hydroxyl group is sterically hindered is preferably chosen from the phenols di-tert-alkylated in the ortho positions relative to the hydroxyl group and 3-(3',5'-di-tert-butyl-4'-hydroxyphenyl)propionic acid esters. Among these compounds, the best results have been obtained with 2,6-di-tert-butyl-4-methylphenol and n-octadecyl 3(3'-5'-di-tert-butyl-4'-hydroxyphenyl)propionate.

In order to obtain catalytic systems according to the present invention, the solid catalyst (a) and the non-halogen-containing cocatalyst (b) are generally used in proportions such that the atomic ratio between the aluminium of the cocatalyst and the titanium of the solid catalyst is from 1 to 50. Such a ratio is generally greater than or equal to 2 and more particularly greater than or equal to 5. This ratio is, in addition, most often less than or equal to 30, preferably less than or equal to 25. Good results are obtained when the aluminium-to-titanium ratio is from 2 to 20.

The preferred catalytic systems according to the present invention, when more stereoregular polymers are desired, additionally contain a tertiary constituent chosen from oxygenated organosilicon compounds and their mixtures.

According to the present invention, oxygenated organosilicon compounds is understood to denote silicon compounds in which the molecule comprises at least one hydrocarbyloxy group.

These compounds are most often chosen from the compounds represented by the general formula:

$$R^4_n Si(OR^5)_{4-n}$$

in which

R$^4$ represents a hydrogen atom or a hydrocarbon radical containing from 1 to 20 carbon atoms chosen, for example, from alkyl, cycloalkyl, alkenyl, aryl, alkylaryl and arylalkyl radicals, which may them
selves bear substituents such as amino groups. $R^4$ is preferably chosen from alkyl, aryl and cycloalkyl radicals preferably containing from 1 to 18 carbon atoms;

$R^5$ represents a hydrocarbon radical containing from 1 to 12 carbon atoms, which may be identical to or different from $R^4$, chosen for example from alkyl, cycloalkyl, alkenyl, aryl, alkylaryl and arylalkyl radicals, which may themselves be substituted with groups such as alkoxy groups. $R^5$ is preferably chosen from alkyl and aryl radicals containing from 1 to 8 carbon atoms;

n is an integer such that $0 \leq n \leq 3$.

In these compounds, the radicals $R^4$ and $R^5$ may, independently of each other, represent identical or different organic radicals. Moreover, the catalytic systems according to the invention may contain one or more silicon compounds.

By way of examples of organosilicon compounds which may be used in the catalytic systems according to the invention, there may be mentioned tetra-, tri- and dimethoxysilanes and tetra-, tri- and diethoxysilanes which are optionally substituted with alkyl, cycloalkyl or aryl radicals, which may be identical or different, chosen for example from methyl, ethyl, n-propyl, isopropyl, n-butyl, sec-butyl, isobutyl, tert-butyl, n-amyl, isoamyl, cyclopentyl, n-hexyl, cyclohexyl and phenyl radicals.

The silicon compounds used preferably contain one or two substituents ($OR^5$) in which the radicals $R^5$, which may be identical or different, are chosen from hydro-carbon radicals containing from 1 to 3 carbon atoms and at least one substituent $R^4$ chosen from alkyl and cycloalkyl radicals containing at least one secondary or tertiary carbon atom. The silicon compounds which have given the best results are the dimethoxy- and diethoxysilanes substituted with at least one alkyl or cycloalkyl radical containing, in the $\alpha$, $\beta$ or $\gamma$ position, a secondary or tertiary carbon atom.

By way of examples of such compounds, there may be mentioned diisobutyldimethoxysilane, di-tert-butyldi-methoxysilane, diisopropyldimethoxysilane, dicyclohexyl-dimethoxysilane, cyclohexylmethyldimethoxysilane, dicyclopentyldi-methoxysilane and isobutylmethyldimethoxysilane.

The silicon compound is generally used in amounts such that the atomic ratio between the aluminium of the cocatalyst and the silicon that it contains is from 0.5 to 50. This ratio is preferably greater than or equal to 1. Good results are generally obtained when this ratio is less than or equal to 20 and more particularly less than or equal to 10.

The catalytic systems thus defined are applied to the polymerization of olefins containing terminal unsaturation, such as alpha-olefins in which the molecule contains from 2 to 18 and preferably from 2 to 6 carbon atoms and in particular ethylene, propylene, 1-butene, 1-pentene, 1-methylbutenes, hexene and 3- and 4-methyl-1-pentenes.

Consequently, the present invention also relates to a process for the polymerization of alpha-olefins in the presence of the catalytic systems described above. According to the present invention, polymerization of the alpha-olefins is understood to refer to the homo- and/or copolymerization of one or more of the monomers mentioned above. A particularly advantageous polymerization process relates to the stereospecific polymerization of propylene, of 1-butene and of 4-methyl-1-pentene into crystalline polymers. The catalytic systems according to the present invention are also applied to the copolymerization of these alpha-olefins with at least one non-identical comonomer chosen from the alpha-olefins as described above and diolefins comprising from 4 to 18 carbon atoms. The diolefins are preferably non-conjugated aliphatic diolefins such as 1,4-hexadiene, 7-methyl-1,6-octadiene and 1,9-decadiene, non-conjugated monocyclic diolefins such as 4-vinylcyclohexene, alicyclic diolefins having an endocyclic bridge such as dicyclopentadiene, methylene- and ethylidenenorbornene and conjugated aliphatic diolefins such as butadiene or isoprene.

They also apply to the manufacture of so-called block copolymers, which are formed starting with alpha-olefins and/or diolefins. These block copolymers consist of distinct blocks of variable composition; each block consists of a homopolymer of an alpha-olefin or consists of a statistical copolymer comprising an alpha-olefin and at least one comonomer chosen from alpha-olefins and diolefins. The alpha-olefins and the diolefins are chosen from those mentioned above.

The catalytic systems according to the invention are particularly suitable for the manufacture of propylene homopolymers. They are equally suitable for the manufacture of copolymers of the latter containing in total at least 50% by weight of propylene and preferably at least 60% by weight of propylene.

In this case, the polymerization temperature generally varies from 20° to 200° C and preferably from 50° to 100° C., the best results being obtained at from 65 to 95° C. The pressure is generally chosen between atmospheric pressure and 60 atmospheres and preferably from 10 to 50 atmospheres. This pressure may be a function of the temperature at which the polymerization is carried out.

The polymerization may be carried out continuously or discontinuously.

The polymerization may be carried out according to any known process: in solution or in suspension in an inert hydrocarbon diluent, such as those defined above. In this specific case, the diluent preferably used is chosen from butane, isobutane, hexane, heptane, cyclohexane, methylcyclohexane or their mixtures. It is also possible to perform the polymerization in the monomer or in one of the monomers maintained in the liquid state or alternatively in the gas phase.

The amount of the various compounds of the catalytic systems according to the invention used for this polymerization is not critical provided that the ratios between the solid catalyst, the cocatalyst and, where appropriate, the silicon compound described above are respected. The process is generally performed such that the total amount of cocatalyst is greater than 0.1 mmol per litre of diluent, of liquid monomer or of reactor volume and preferably greater than or equal to 0.5 mmol per litre.

The solid catalyst (a), the cocatalyst (b) and, where appropriate, the silicon compound are generally added separately to the polymerization medium. The order of introduction of these compounds is not critical. It may, however, prove to be advantageous to introduce the solid catalyst last.

It is also possible to carry out a pre-contact between the cocatalyst (b) and the silicon compound or between the solid catalyst (a) and one or other of these compounds, or alternatively between these three compounds before using them for the polymerization.

Such a pre-contact is generally carried out at a variable temperature of from −40° to +80° C. for a period which is dependent on this temperature and which may range from a few seconds to a few hours or even days.

However, when the pre-contact involves the solid catalyst (a), it is preferred to limit the duration of the pre-contact to a few seconds or even a few minutes. It is also noticed that a pre-contact of the trialkylaluminium and of the silicon compound at high temperature and for relatively long periods is unfavourable.

In the case where the cocatalyst (b) contains the organoaluminium compound and the aminoalane obtained beforehand, these two compounds may be introduced in any manner into the polymerization reactor. Preferably, a pre-contact between the aminoalane and at least one fraction of the organoaluminium compound is carried out before introducing them into the polymerization medium as described above.

The average molecular mass of the polymers manufactured according to the process of the invention may be regulated by addition to the polymerization medium of one or more regulating agents of average molecular mass, such as hydrogen, diethylzinc, alcohols, ethers and alkyl halides. Hydrogen is suitable.

The catalytic systems according to the invention may advantageously be used for the production, with particularly high yields, of propylene polymers having a wide range of stereospecificity.

The use of the catalytic systems according to the invention makes it additionally possible to obtain, with good yields, polymers containing a lower amount of chlorine than that measured for the polymers derived from traditional catalytic systems based on titanium trichloride. As a result, the polymers obtained are more stable and their use does not bring about any corrosion phenomena on the devices used for this purpose. In addition, the stabilization of these polymers requires smaller amounts of additives, which constitutes not only an economic advantage but also enables the said polymers to be used in applications where a greater purity is required.

The catalytic systems according to the invention, when they are used in gas-phase polymerization processes, also make it possible to avoid the formation in total or in part, in the polymerization reactor or in the device for circulation of the gaseous monomers, of low molecular weight polymers in the form of viscous or semi-solid oils, which are capable of disrupting the smooth functioning of the polymerization reactor. Such a use of the catalytic systems according to the invention is consequently particularly favourable.

It is noted, moreover, that the catalytic systems according to the present invention are particularly active and have a high stereospecificity, even when the molar ratio between the aluminium of the cocatalyst and the titanium of the solid catalyst is relatively high. It is also observed that the catalytic systems according to the present invention have the advantage of being able to be used in a wide range of aluminium of the cocatalyst/ titanium of the solid catalyst molar ratios without the properties of the polymers obtained being affected. Such behaviour enables the reproducibility of the polymerization results to be enhanced and are consequently particularly favourable for industrial applications.

Another advantage of the catalytic systems according to the invention is that the amount of silicon compound required to obtain a high stereoregularity is particularly low relative to the systems containing no aminoalane.

EXAMPLES

The examples which follow serve to illustrate the invention.

The meaning of the symbols used in these examples, the units expressing the magnitudes mentioned and the methods for measuring these magnitudes are explained below.

act. = catalytic activity expressed conventionally in grams of polymer obtained per hour and per gram of $TiCl_3$ contained in the solid catalyst. This activity is assessed indirectly from the determination of the residual titanium content in the polymer by X-ray fluorescence.

AD = apparent density of the insoluble polymer expressed in $g/dm^3$.

MFI = melt flow index measured under a charge of 2.16 kg at 230° C. and expressed in g/10 min (ASTM standard D 1238)(1986).

Sol. = isotactic index for the polymer, evaluated by the fraction of the latter, expressed in % by weight relative to the total amount of polymer collected, which is soluble in the polymerization hexane.

Examples 1 to 3

A—Preparation of the Solid Catalyst 90 ml of dry hexane and 60 ml of pure $TiCl_4$ are introduced, under a nitrogen atmosphere, into an 800 ml reactor equipped with a stirrer with two blades rotating at 400 revolutions/min. This hexane-$TiCl_4$ solution is cooled to 0 (±1)° C. A solution consisting of 190 ml of hexane and 70 ml of diethylaluminium chloride (DEAC) is added thereto over 4 h, maintaining the temperature in the reactor at 0 (±1)° C.

After addition of the DEAC-hexane solution, the reaction medium consisting of a suspension of fine particles is kept stirring at 0 (±1)° C. for 15 min and is then brought over 1 h to 25° C. and maintained for 1 h at this temperature and subsequently brought over 1 h approximately to 65° C. The medium is kept stirring for 2 h at 65° C. and is then cooled to approximately 55° C. and propylene at a pressure of 2 bar is introduced into the gas ceiling of the reactor.

This introduction is continued for a sufficient time (approximately 45 min) to obtain, per kg of final solid, 65 g of polymerized propylene. The suspension of the solid thus pre-polymerized is subsequently cooled to 40° C. and washed with dry hexane.

The reduced solid thus obtained is suspended in 456 ml of diluent (hexane) and 86 ml of diisoamyl ether (DIAE) are added thereto.

The suspension is stirred at 250 rev/min for 1 h at 50° C. and then decanted. After having removed the supernatent, the solid is resuspended in 210 ml of hexane and 52 ml of $TiCl_4$ are added thereto. The suspension is subsequently kept stirring (150 rev/min) at 75° C. for 2 h. The liquid phase is subsequently removed by filtration and the solid based on complexed titanium trichloride is washed with dry hexane. The solid based on complexed $TiCl_3$ thus obtained is then resuspended in hexane (in an amount of 4 ml of hexane per gram of solid) and placed in contact with 120 ml of a solution containing, per litre of hexane, 80 g of DEAC and 176.2 g of n-octadecyl 3-(3', 5'-di-tert-butyl-4'-hydroxyphenyl)propionate.

The suspension thus added to is maintained for 1 hour at 30° C. with stirring.

After decanting, the resultant activated solid catalyst is washed with dry hexane, with resuspension of the solid.

The activated solid catalyst thus obtained contains, per kg, 720 g of $TiCl_3$ and 40 g of DIAE.

B—Preparation of the Cocatalyst

The following are successively introduced into a glass reactor maintained under nitrogen, at room temperature and with stirring:

50 ml of toluene;

5 ml of triethylaluminium (TEAL) (36.5 mmol); and 13.8 ml of ethylenediamine as a 0.88 molar solution in toluene (12.1 mmol).

The mixture is subsequently brought to reflux of the toluene (110° C.) for 1 hour before being cooled and used in the polymerization. The product obtained (TEAL/ aminoalane mixture) does not give rise to a release of ethane when it is subjected to a heat treatment at 100° C. for 1 hour.

C—Polymerization of Propylene Suspended in Hexane

The following are introduced into a 5 l autoclave, dried beforehand, under a stream of dry nitrogen:

500 ml of hexane 4.9 ml of the solution containing the cocatalyst as prepared in point B.

3.4 ml of diisobutyldimethoxysilane (in the form of a solution in hexane containing 0.384 mol/l)

an amount of solid catalyst such that the molar ratio between the aluminium of the cocatalyst and the titanium of this solid is equal to that given in Table I below.

The stirring is subsequently started, and the autoclave is connected to an oil-filled bubbler and finally heated to the polymerization temperature. Once 63° C. is reached, the autoclave is isolated and a pressure of 1 bar of $H_2$ is introduced. The propylene is subsequently admitted and the working pressure (24 bar absolute) is maintained for the duration of the test (3 hours), at the working temperature (70° C).

The polymerization reaction is then stopped by addition of a mixture of water (250 ml) and sodium hydroxide (25 mmol). The solid polymer is isolated by filtration and the polymer soluble in the polymerization hexane is collected by evaporation of the solvent. The characteristics of these tests are summarized in Table I below.

TABLE I

| Examples | 1 | 2 | 3 |
|---|---|---|---|
| Amount of cocatalyst (ml) | 4.9 | 4.9 | 4.9 |
| Al/Ti molar ratio | 13.3 | 9.1 | 6.6 |
| Al/Si molar ratio | 2 | 2 | 2 |
| Polymerization results | | | |
| act. | 2875 | 2797 | 2587 |
| AD | 453 | 444 | 473 |
| Sol. | 2 | 2 | 2 |
| MFI | 5.7 | 6.8 | 7.7 |
| Cl in the polymer (ppm) | 80 | 82 | 89 |

It is observed that the activity of the catalytic systems according to the invention increases slightly with the Al/Ti ratio, the other parameters remaining substantially identical.

Comparative Example 4R

Example 4R illustrates the polymerization of propylene under identical conditions to those of Example 1, but using a catalytic system containing as cocatalyst 5 mmol of TEAL and 72 mg of solid catalyst. The molar ratio between the aluminium of the TEAL and the titanium of the solid catalyst is 14.9.

This test allows a tacky polymer, which is difficult to manipulate and has an activity of 2156 and an isotactic index Sol. of 19.2, to be collected. The MFI of this polymer is 18.2.

Comparative Example 5R

Propylene is polymerized under the conditions of Example 1 part C using a catalytic system containing:

119 mg of solid catalyst as described in Example 1 part A;

5.4 ml of a solution obtained by placing together 10 ml of TEAL (73.6 mmol), 41.8 ml of 0.88 molar ethylenediamine solution in toluene and 100 ml of toluene, which solution has not undergone a heat treatment. This solution thus contains the active hydrogen in the sense of the present invention.

This test allows a polymer having an AD of 377, with an activity of 147 and a Sol. of 8.8, to be collected.

This comparative example demonstrates the importance of the absence of active hydrogen in the cocatalysts according to the invention.

Examples 6, 7 and 8

Examples 6 and 7 illustrate the cocatalysts obtained by placing trialkylaluminium in contact with a primary and secondary monoamine.

Example 6 is carried out using a cocatalyst obtained by placing together 10 ml of TEAL and 3 ml of n-propylamine in 125 ml of toluene, at room temperature and in an aluminium/nitrogen atomic ratio of 2, and heat treatment of this mixture to reflux of the toluene for 1 h. At the end of this heat treatment, the release of ethane has completely disappeared.

Example 7 is carried out using a cocatalyst obtained by placing together 10 ml of TEAL and 5 ml of di-n-propylamine in 140 ml of toluene, in an aluminium/ nitrogen atomic ratio of 2. This solution is only used once the release of gas accompanying the reaction of the amine with TEAL has ended. Under these conditions, a mixture which no longer contains any active hydrogen in the sense of the present invention is obtained.

The results of the polymerization tests and the conditions under which they were carried out are summarized in Table II below.

TABLE II

| Examples | 6 | 7 | 8 |
|---|---|---|---|
| Amount of cocatalyst (ml) | | | |
| Al/Ti molar ratio | 11.5 | 8.1 | 9.6 |
| Al/Si molar ratio | 2 | 2 | 5 |
| Polymerization results | | | |
| act. | 3981 | 3981 | 4704 |
| AD | 475 | 462 | 457 |
| Sol. | 1.4 | 1.0 | 1.7 |
| MFI | 3.1 | 1.9 | 2.9 |
| Cl in the polymer (ppm) | 58 | 58 | 49 |

What is claimed is:

1. A catalytic composition which may be used for polymerization of alpha-olefins, comprising:

(a) a solid catalyst comprising titanium trichloride ($TiCl_3$);

(b) a non-halogen-containing cocatalyst comprising at least one non-halogen-containing organoaluminium compound selected from the group consisting of trialkylaluminiums possessing identical or different alkyl radicals containing from 1 to 12 carbon atoms, wherein the non-halogen-containing cocatalyst additionally contains at least one aminoalane containing no active hydrogen selected from the group consisting of organoaluminium compounds containing at least one aluminum/nitrogen bond which do not release ethane when they are placed in the presence of triethylaluminium at a temperature of between 80° and 120° C. approximately; and (c) at least one oxygenated organosilicon compound.

2. The catalytic composition according to claim 1, wherein the oxygenated organosilicon compound is chosen from the compounds corresponding to the formula:

$$R^4{}_n Si(OR^5)_{4-n}$$

in which $R^4$ represents a hydrogen atom or a hydrocarbon radical containing from 1 to 20 carbon atoms comprising alkyl, cycloalkyl, alkenyl, aryl, alkylaryl and arylalkyl radicals, which may themselves bear substituents comprising amino groups;

$R^5$ represents a hydrocarbon radical containing from 1 to 12 carbon atoms, which may be identical to or different from $R^4$, comprising alkyl, cycloalkyl, alkenyl, aryl, alkylaryl and arylalkyl radicals, which may themselves be substituted with groups comprising alkoxy groups;

n is an integer such that $0 \leq n \leq 3$.

3. The catalytic composition according to claim 1, wherein the atomic ratio between the aluminum of the non-halogen-containing cocatalyst and the silicon of the oxygenated organosilicon compound is from 0.5 to 50.

* * * * *